US012502490B2

(12) United States Patent
Barrett et al.

(10) Patent No.: US 12,502,490 B2
(45) Date of Patent: Dec. 23, 2025

(54) MANIFOLD

(71) Applicant: Merxin Ltd, King's Lynn (GB)

(72) Inventors: Adam Barrett, King's Lynn (GB); Adam Stuart, King's Lynn (GB)

( * ) Notice: Subject to any disclaimer, the term of this patent is extended or adjusted under 35 U.S.C. 154(b) by 875 days.

(21) Appl. No.: 17/732,853

(22) Filed: Apr. 29, 2022

(65) Prior Publication Data

US 2023/0347079 A1 Nov. 2, 2023

(51) Int. Cl.
*A61M 15/00* (2006.01)
*A61M 16/12* (2006.01)

(52) U.S. Cl.
CPC .... *A61M 15/0045* (2013.01); *A61M 15/0008* (2014.02); *A61M 16/127* (2014.02); *A61M 2202/064* (2013.01)

(58) Field of Classification Search
CPC .......... A61M 15/0045; A61M 15/0008; A61M 16/127; A61M 2202/064; A61M 15/003; A61M 2206/16
See application file for complete search history.

(56) References Cited

U.S. PATENT DOCUMENTS

| | | |
|---|---|---|
| 2,587,215 A | 2/1952 | Priestly |
| 4,907,583 A | 3/1990 | Wetterlin et al. |
| 5,113,855 A | 5/1992 | Newhouse |
| 5,383,850 A | 1/1995 | Schwab et al. |

(Continued)

FOREIGN PATENT DOCUMENTS

| | | |
|---|---|---|
| EP | 1106196 A2 | 6/2001 |
| EP | 1960021 B1 | 8/2008 |

(Continued)

OTHER PUBLICATIONS

Combined Search and Examination Report under Sections 17 and 18(3) issued in GB Patent Application GB2206312.7 on Oct. 12, 2022, 10 pages.

(Continued)

*Primary Examiner* — Justine R Yu
*Assistant Examiner* — Matthew R Moon
(74) *Attorney, Agent, or Firm* — RC Trademark Company

(57) ABSTRACT

In general terms the present invention proposes a manifold 100 for delivery of medicament powder from a dispenser device. The manifold 100 comprises a first chamber 102 comprising a first chamber inlet 102A and a first chamber outlet 102B. The first chamber 102 is arranged to direct a first flow of air 110 from the first chamber inlet 102A to the first chamber outlet 102B. The manifold 100 also comprises a conduit 104 having a conduit inlet 104A and a conduit outlet 104B. The first chamber outlet 102B and conduit inlet 104A are arranged such that when a supply of medicament powder is positioned proximal thereto the first flow of air 110 is directed from the first chamber outlet 102B to the conduit inlet 104A via the supply of medicament powder to entrain the medicament powder and provide a flow of air entrained with medicament powder through the conduit 104. The manifold 100 has a bleed inlet 106 in a wall of the conduit 104 outside of the first chamber 102 arranged to direct a second flow of air 112 into the conduit 104 to disruptively impact the flow of air entrained with medicament powder through the conduit 104.

19 Claims, 10 Drawing Sheets

(56) References Cited

U.S. PATENT DOCUMENTS

| | | | | |
|---|---|---|---|---|
| 5,590,645 | A | 1/1997 | Davies et al. | |
| 5,647,349 | A | 7/1997 | Ohki et al. | |
| 8,022,082 | B2 | 9/2011 | Zierenberg | |
| 8,534,281 | B2 | 9/2013 | Davies et al. | |
| 10,357,622 | B2 | 7/2019 | Dhuppad et al. | |
| 2003/0183229 | A1 | 10/2003 | Smith et al. | |
| 2007/0137645 | A1 | 6/2007 | Eason et al. | |
| 2009/0314291 | A1 | 12/2009 | Anderson | |
| 2010/0000528 | A1* | 1/2010 | Palmer | A61M 15/0045 128/203.15 |
| 2011/0094507 | A1* | 4/2011 | Wachtel | A61M 15/0051 128/200.21 |
| 2023/0095950 | A1* | 3/2023 | Crowley | A61M 15/0078 128/203.15 |

FOREIGN PATENT DOCUMENTS

| | | | |
|---|---|---|---|
| EP | 2082762 | A1 | 7/2009 |
| GB | 2242134 | A | 9/1991 |
| GB | 2270293 | A | 3/1994 |
| WO | 9408552 | A2 | 4/1994 |
| WO | 9411044 | A2 | 5/1994 |
| WO | 9811929 | A1 | 3/1998 |
| WO | 9830262 | A2 | 7/1998 |
| WO | 02102444 | A1 | 12/2002 |
| WO | 2005002654 | A2 | 1/2005 |
| WO | 2006061637 | A2 | 6/2006 |
| WO | 2006066910 | A1 | 6/2006 |
| WO | 2007068896 | A1 | 6/2007 |
| WO | 2014012069 | A2 | 1/2014 |

OTHER PUBLICATIONS

International Search Report and Written Opinion issued for International Patent Application PCT/IB2023/054444, on Jul. 31, 2023, 11 Pages.

* cited by examiner

MANIFOLD

TECHNICAL FIELD

This invention relates to medicament dispensers for dispensing dry powder medicaments. In particular, though not exclusively, this invention relates to a manifold for delivery of medicament powder from a dispenser device and to a dispenser device comprising the manifold.

BACKGROUND

The use of inhalation devices in the administration of medicaments, for example in bronchodilation therapy is well known. Such devices generally comprise a body or housing within which a supply of medicament carrier is located. Known inhalation devices include those in which the supply of medicament is a blister pack containing a number of blister pockets for containment of medicament in dry powder form.

Such devices typically contain a mechanism for accessing a medicament dose by opening one or more blister pockets. The mechanism may, for example, comprise either a piercing means or a peeling means to peel a lid sheet away from a base sheet of the blister pack. The powdered medicament is then liberated from the opened blister pocket(s) for inhaled delivery to the patient.

Inhalation devices of the type described above typically comprise an element, referred to as a manifold, for guiding airflow towards the one or more opened blister pocket(s) for liberating the powdered medicament contained therein, and subsequently guiding the liberated powder to a mouthpiece for inhalation by a patient.

The form of the manifold is known to affect the particle size characteristics of the liberated medicament powder. Such characteristics are known to be pharmaceutically important. In particular, the fine particle fraction can be influenced by the form of the manifold. The “fine particle fraction” or FP fraction generally refers to the percentage of particles within a given dose of aerosolised medicament that is of “respirable” size.

There remains a need for improved manifolds that can increase the FP fraction of the aerosolised medicament powder delivered to the patient. It is an object of the invention to address at least one of the above problems, or another problem associated with the prior art.

SUMMARY OF THE INVENTION

A first aspect of the invention provides a manifold for delivery of medicament powder from a dispenser device. The manifold comprises a first chamber comprising a first chamber inlet and a first chamber outlet, the first chamber arranged to direct a first flow of air from the first chamber inlet to the first chamber outlet.

The manifold also comprises a conduit having a conduit inlet and a conduit outlet, wherein the first chamber outlet and the conduit inlet are arranged such that when a supply of medicament powder is positioned proximal thereto the first flow of air is directed from the first chamber outlet to the conduit inlet via the supply of medicament powder to entrain the medicament powder and provide a flow of air entrained with medicament powder through the conduit from the conduit inlet to the conduit outlet.

The manifold further comprises a bleed inlet in a wall of the conduit outside of the first chamber arranged to direct a second flow of air into the conduit to disruptively impact the flow of air entrained with medicament powder through the conduit.

It has been found that such an arrangement may advantageously provide for a finer level of control over the device resistance, and FP fraction performance by allowing for the first flow of air into the supply of medicament powder to be separated from second flow of air directed into the conduit through the bleed hole. In particular, such an arrangement has been found to advantageously increase the FP fraction of the aerosolised medicament powder and reduce the impact of variations in flow rate on the FP fraction. Moreover, it has been found that in such an arrangement, it may be possible to modify the geometry of each of the first chamber and the bleed inlet independently without affecting the performance of the other.

In some embodiments, the first chamber outlet and conduit inlet may be arranged such that when a supply of medicament powder is positioned adjacent thereto the first flow of air is directed from the first chamber outlet to the conduit inlet via the supply of medicament powder to entrain the medicament powder and provide a flow of air entrained with medicament powder through the conduit from the conduit inlet to the conduit outlet.

Suitably, the first chamber inlet may be arranged to draw air external to (i.e. outside of) a dispenser device comprising the manifold into the first chamber. For example, the first chamber inlet may be in fluid connection with a first device inlet of a dispenser device comprising the manifold, the first device inlet being arranged to draw air external to the device into the device.

Suitably, the bleed inlet may be arranged to draw air external to a dispenser device comprising the manifold into the conduit. For example, the bleed inlet may be in fluid connection with a second device inlet of a dispenser device comprising the manifold, the second device inlet being arranged to draw air external to the device into the device.

In some embodiments, the manifold may comprise a second chamber. Suitably, the second chamber may comprise a second chamber inlet arranged to direct a second flow of air from the second chamber inlet to the bleed inlet. Advantageously, in such arrangements, it may be possible to modify the geometry of each of the first chamber and the second chamber independently without affecting the performance of the other.

Suitably, the second chamber inlet may be arranged to draw air external to (i.e. outside of) a dispenser device comprising the manifold into the second chamber. For example, the second chamber inlet may be in fluid connection with a second device inlet of a dispenser device comprising the manifold, the second device inlet being arranged to draw air external to the device into the device.

In some embodiments, the first and second chambers may be located on substantially opposite sides of the conduit.

In some embodiments, the first and second chambers may be located substantially on a same side of the conduit. For example, the first and second chambers may be arranged substantially side-by-side.

In some embodiments, the bleed inlet may be located on a first side of the conduit and the first chamber may be located at a second side of the conduit generally orthogonal to the first side of the conduit. For example, the bleed inlet may be located on a first side of the conduit and the first chamber may be located at a second side of the conduit generally at a right angle (i.e. at about 90°) to the first side of the conduit.

Suitably, the direction of the bleed inlet into the conduit may be generally orthogonal to the direction of the first chamber inlet into the first chamber. For example, the direction of the bleed inlet into the conduit may be generally at a right angle (i.e. at about 90°) to the direction of the first chamber inlet into the first chamber.

Additionally, or alternatively, the direction of the bleed inlet into the conduit may be generally orthogonal to the direction of the second chamber inlet into the second chamber. For example, the direction of the bleed inlet into the conduit may be generally at a right angle (i.e. at about 90°) to the direction of the second chamber inlet into the second chamber.

In some embodiments, the bleed inlet may be located on a first side of the conduit and the first chamber may be located at a second side of the conduit substantially opposite to the first side.

In some embodiments, the direction of the bleed inlet into the conduit may be generally in line with the direction of the first chamber inlet into the first chamber. Suitably, the direction of the bleed inlet into the conduit may be generally in the same plane as the direction of the first chamber inlet into the first chamber.

Additionally, or alternatively, the direction of the bleed inlet into the conduit may be generally in line with the direction of the second chamber inlet into the second chamber. Suitably, the direction of the bleed inlet into the conduit may be generally in the same plane as the direction of the second chamber inlet into the second chamber.

In some embodiments, the bleed inlet and first chamber may be located substantially on the same side of the conduit.

In some embodiments, the direction of the bleed inlet into the conduit may be generally parallel to the direction of the first chamber inlet into the first chamber.

In some embodiments, the manifold may comprise a pair of bleed inlets. Suitably, the pair of bleed inlets may be located substantially on the same side of the conduit. For example, the pair of bleed inlets may be arranged substantially side-by-side.

In some embodiments, the first chamber outlet and/or the conduit inlet may comprise a baffle. Suitably, the baffle may comprise a grille and/or cross-piece spanning the outlet/inlet. The presence of a baffle may advantageously be used to control air flow through the first chamber outlet and/or the conduit inlet. Moreover, the presence of a baffle may serve to prevent large particles of dry powder (i.e. having a particle size falling outside the upper limit of a defined size range) from entering the conduit inlet.

In some embodiments, the conduit may have an elongate length between the conduit inlet and the conduit outlet.

In some embodiments, the bleed inlet may be located partway along the length of the conduit between the conduit inlet and the conduit outlet. Suitably, the bleed inlet may be located at or between one third and two thirds of the length of the conduit. For example, the conduit may be located about halfway along the length of the conduit, i.e. at or towards the middle of the length of the conduit.

In some embodiments, the bleed inlet may comprise a circular or elliptical opening in the wall of the conduit. In some embodiments, the bleed inlet may comprise an oblong or oval opening in the wall of the conduit. Suitably, the bleed inlet may generally elongate having curved first and second ends.

The bleed inlet may define an opening in the wall of the conduit having a width across the opening, and a depth through the wall of the conduit. In some embodiments, the bleed inlet may have a width across the opening greater than the depth of the bleed inlet through the wall of the conduit. For example, the bleed inlet may have a width across the widest point of the opening greater than the depth of the bleed inlet through the wall of the conduit. Where the bleed inlet comprises a circular opening, the bleed inlet may have a diameter greater than the depth of the bleed inlet through the wall of the conduit.

In some embodiments, the manifold may be formed from a single moulding. Suitably, the single moulding may be injection moulded.

In some embodiments, the manifold may be formed by the abutment of two or more moulded parts. Suitably, one or more of the moulded parts may be injection moulded.

A second aspect of the invention provides a dispenser device comprising: a manifold according to the first aspect of the invention; and a medicament chamber in fluid connection with the first chamber outlet and the conduit inlet, wherein the medicament chamber comprises a supply of medicament powder.

In some embodiments, the dispenser device may comprise first and second device inlets in fluid connection with the first chamber inlet and the bleed inlet respectively.

In some embodiments, the dispenser device may comprise first and second device inlets in fluid connection with the first and second chamber second inlets respectively.

In some embodiments, the first device inlet may be located on first side of the device and the second device inlet may be located on a second side of the device substantially opposite to the first side of the device.

In some embodiments, the first and second device inlets may be located substantially on the same side of the device. For example, the first and second device inlets may be arranged substantially side-by-side.

In some embodiments, the dispenser device may comprise a device inlet in fluid connection with the first chamber and the bleed inlet.

In some embodiments, a wall of the first chamber of the manifold may abut the device inlet to divide external air entering the dispenser device through the device inlet into first and second flows of air inside the device.

In some embodiments, the supply of medicament powder may comprise a blister pack. Suitably, the supply of medicament powder may comprise an open blister pocket of a blister pack.

In some embodiments, the supply of medicament powder may comprise a plurality of blister packs. Suitably, the supply of medicament powder may comprise a plurality of open blister pockets of one or more blister packs.

In some embodiments, the supply of medicament powder may comprise a capsule, for example such as a gelatin capsule. Suitably, the supply of medicament powder may comprise a pierced capsule.

In some embodiments, the supply of medicament powder may comprise a plurality of capsules. Suitably, the supply of medicament powder may comprise a plurality of pierced capsules.

In some embodiments, the dispenser device may comprise a mouthpiece in fluid connection with the conduit outlet.

Throughout the description and claims of this specification, the words “comprise” and “contain” and variations of the words, for example “comprising” and “comprises”, mean “including but not limited to”, and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1A:
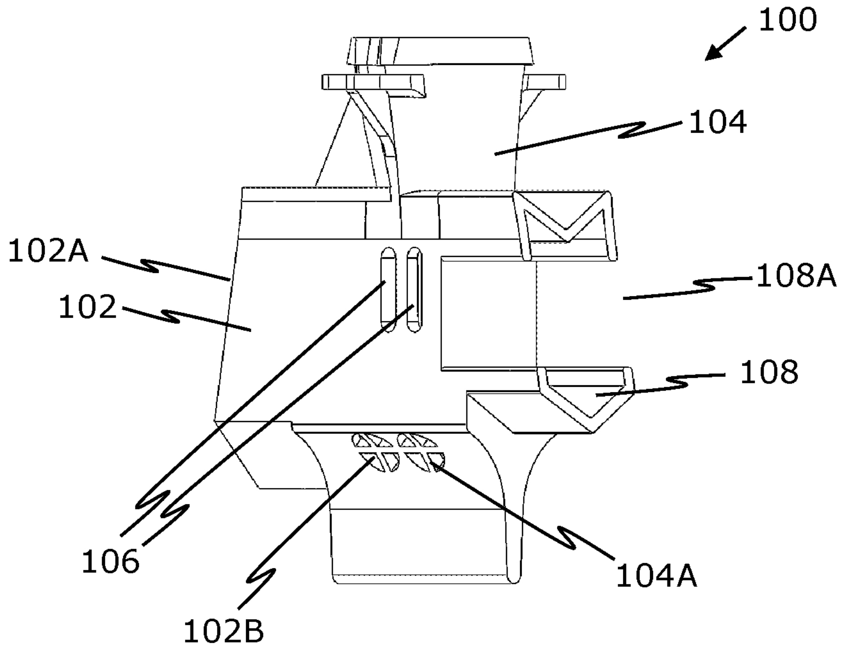
FIG. 1A is a perspective view of a manifold in accordance with a first embodiment of the invention.
Figure 1B:
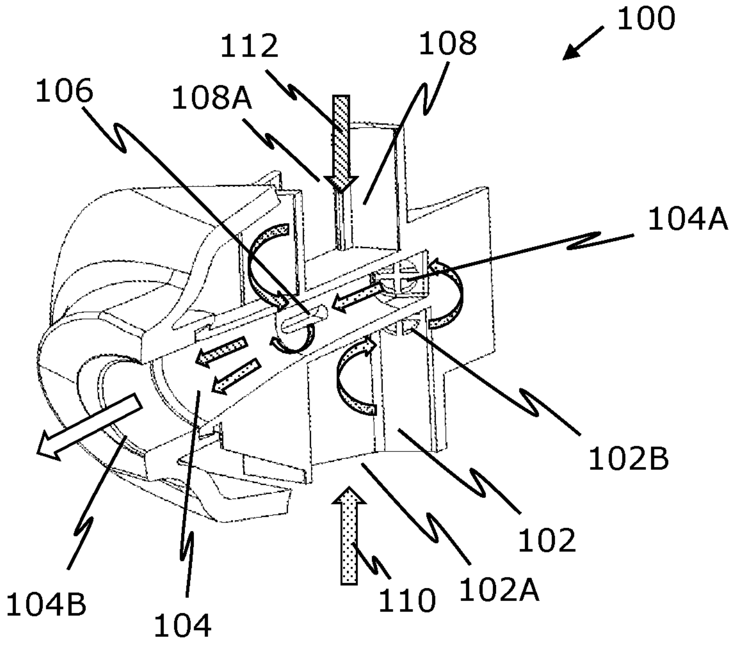
FIG. 1B is a cross-sectional view of the manifold of FIG. 1A.
Figure 1C:
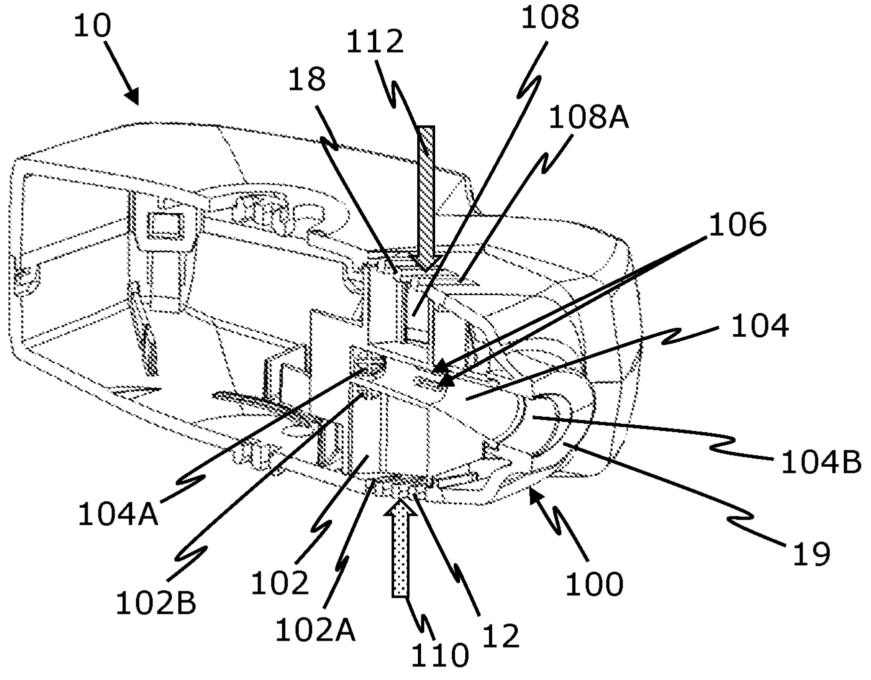
FIG. 1C is a cross-sectional view of the manifold of FIG. 1A inside a dispenser device.

Referring to FIGS. 1A to 1C, a manifold 100 in accordance with a first embodiment of the invention comprises a first chamber 102 comprising a first chamber inlet 102A and a first chamber outlet 102B.

The manifold 100 also has a conduit 104 having a conduit inlet 104A and a conduit outlet 104B. The conduit 104 has an elongate length between the conduit inlet 104A and the conduit outlet 104B. A pair of bleed inlets 106 are arranged side-by-side in a wall of the conduit 104 outside of the first chamber 102. In this example, the pair of bleed inlets 106 are located about halfway along the length of the conduit 104. Each of the bleed inlets 106 defines an oblong shaped opening in the wall of the conduit 104.

The manifold 100 further comprises a second chamber 108 having a second chamber inlet 108A. The second chamber 108 is in fluid connection with the pair of bleed inlets 106. In the manifold 100, the first chamber 102 and second chamber 108 are located on opposite sides of the conduit 104. The direction of each of the bleed inlets 106 into the conduit 104 is generally orthogonal to the direction of the first chamber inlet 102A into the first chamber 102 and to the direction of the second chamber inlet 108A into the second chamber 108.

Referring to FIG. 1B, the first chamber 102 is arranged to direct a first flow 110 of air from the first chamber inlet 102A to the first chamber outlet 102B, where it passes through a supply of medicament powder (not shown) positioned next to both the first chamber outlet 102B and conduit inlet 104A. As the first flow 110 of air passes through the supply of medicament, it becomes entrained with the medicament powder. The first flow 110 of air entrained with medicament powder then flows into the conduit inlet 104A and along the conduit 104 to the conduit outlet 104B, where it exits the manifold 100.

The second chamber 108 is arranged to direct a second flow 112 of air from the second chamber inlet 108A to the bleed inlets 106. The bleed inlets 106 are configured to direct the second flow 112 of air into the conduit 104 to disruptively impact the first flow 110 of air entrained with medicament powder as it flows through the conduit 104. This advantageously increases the FP fraction of the medicament powder entrained in the first flow 110 of air as it passes through the conduit 104.

FIG. 1C provides a cross-sectional view of the manifold 100 inside a dispenser device 10. The dispenser device 10 has first and second inlet grates 12, 18 and a mouthpiece 19. The first inlet grate 12 is in fluid connection with the first chamber inlet 102A. The second inlet grate 18 is in fluid connection with the second chamber inlet 108A. The mouthpiece 19 is in fluid connection with the conduit outlet 104B.

In use, the first chamber 102 is arranged to draw air external to the device 10 into the first chamber 102 through the first inlet grate 12 and first chamber inlet 102A. The second chamber 108 is arranged to draw air external to the device 10 into the second chamber 108 through the second inlet grate 18 and second chamber inlet 108A. The first flow 110 of air entrained with medicament powder exits the device 10 through the mouthpiece 19.

Figure 2A:
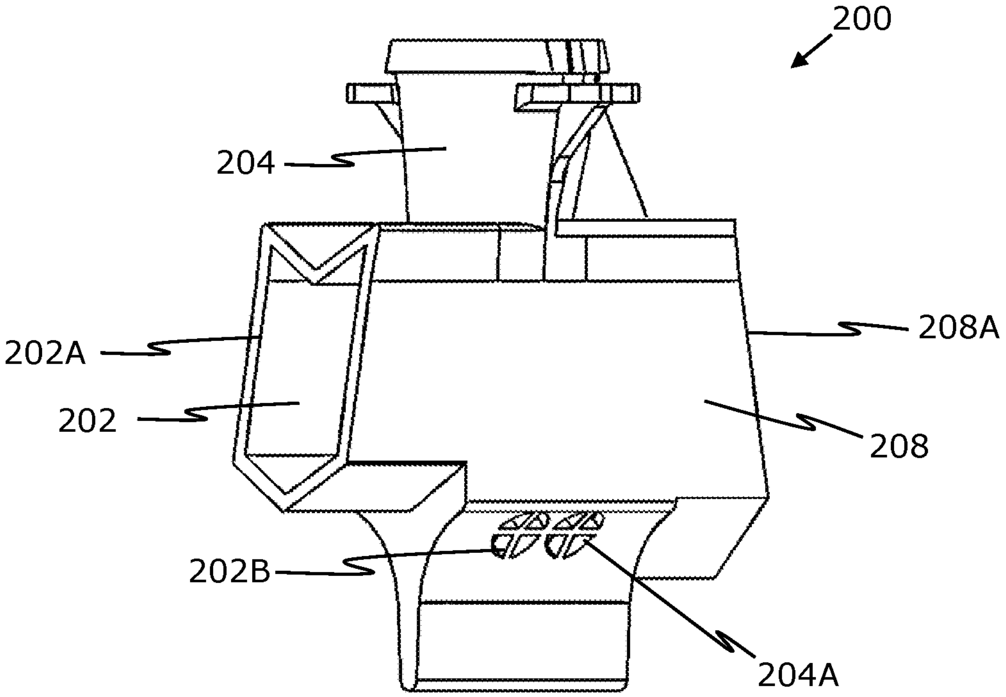
FIG. 2A is perspective view of a manifold in accordance with a second embodiment of the invention.
Figure 2B:
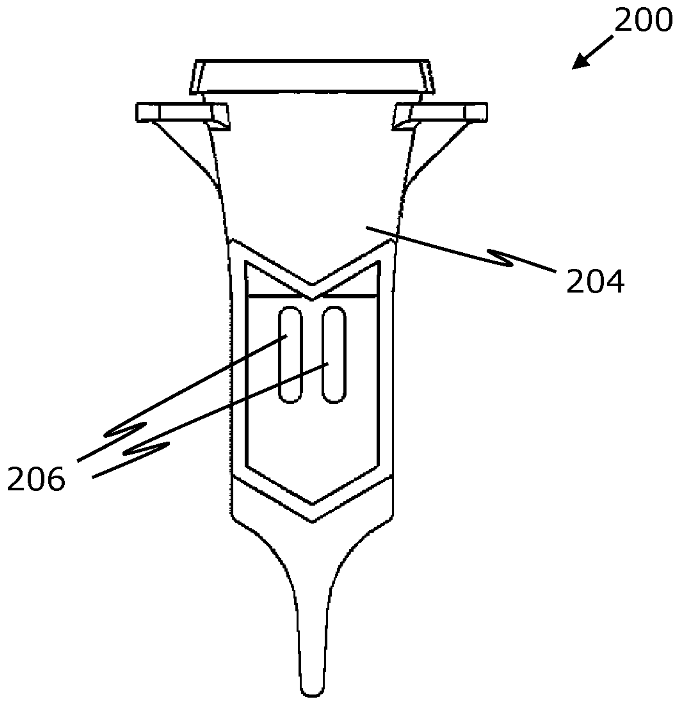
FIG. 2B is a side view of the manifold of FIG. 2A.
Figure 2C:
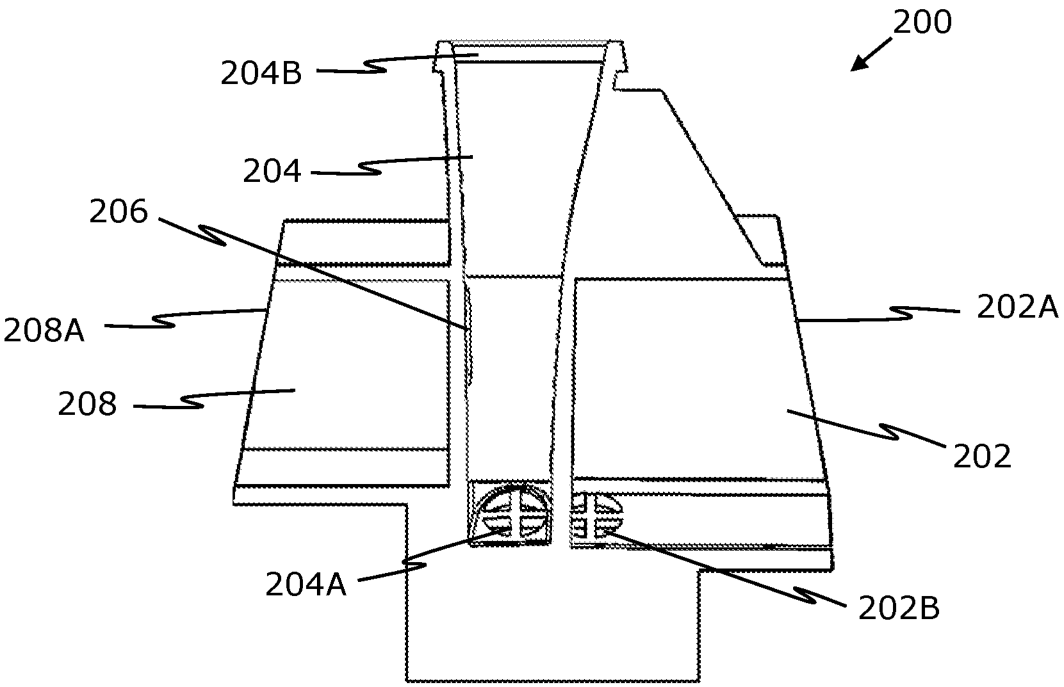
FIG. 2C is a cross-sectional view of the manifold of FIG. 2A.

Referring to FIGS. 2A to 2C, a manifold 200 in accordance with a second embodiment of the invention comprises a first chamber 202 comprising a first chamber inlet 202A and a first chamber outlet 202B.

The manifold 200 also has a conduit 204 having a conduit inlet 204A and a conduit outlet 204B. The conduit 204 has an elongate length between the conduit inlet 204A and the conduit outlet 204B. A pair of bleed inlets 206 are arranged side-by-side in a wall of the conduit 204 outside of the first chamber 202. In this example, the pair of bleed inlets 206 are located about halfway along the length of the conduit 204. Each of the bleed inlets 206 defines an oblong shaped opening in the wall of the conduit 204.

The manifold 200 further comprises a second chamber 208 having a second chamber inlet 208A. The second chamber 208 is in fluid connection with the pair of bleed inlets 206. In the manifold 200, the first chamber 202 and second chamber 208 are located on opposite sides of the conduit 204. The direction of each the bleed inlets 206 into the conduit 204 is in generally line with the direction of the first chamber inlet 202A into the first chamber 202 and with the direction of the second chamber inlet 208A into the second chamber 208.

In use, the first chamber 202 is arranged to direct a first flow of air (not shown) from the first chamber inlet 202A to the first chamber outlet 202B, where it passes through a supply of medicament powder (not shown) positioned next to both the first chamber outlet 202B and conduit inlet 204A. As the first flow of air passes through the supply of medicament, it becomes entrained with the medicament powder. The first flow of air entrained with medicament powder then flows into the conduit inlet 204A and along the conduit 204 to the conduit outlet 204B, where it exits the manifold 200.

The second chamber 208 is arranged to direct a second flow of air (not shown) from the second chamber inlet 208A to the bleed inlets 206. The bleed inlets 206 are configured to direct the second flow of air into the conduit 204 to disruptively impact the first flow of air entrained with medicament powder as it flows through the conduit 204. This advantageously increases the FP fraction of the medicament powder entrained in the first flow of air as it passes through the conduit 204.

Figure 3A:
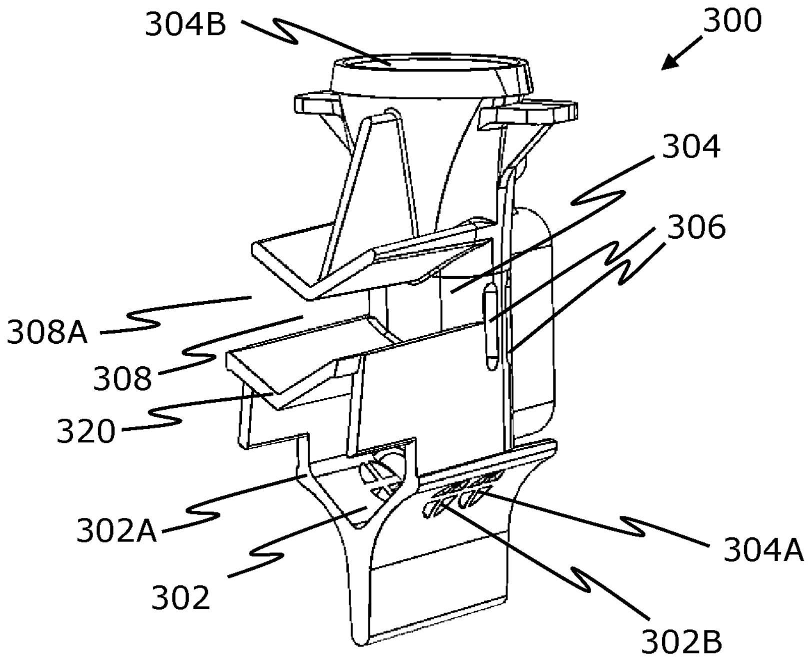
FIG. 3A is a perspective view of a manifold in accordance with a third embodiment of the invention.
Figure 3B:
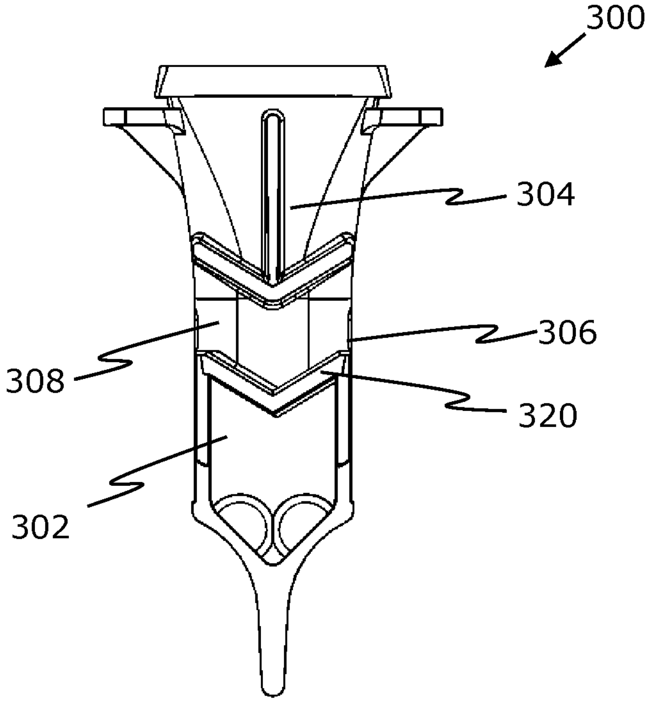
FIG. 3B is a side view of the manifold of FIG. 3A.
Figure 3C:
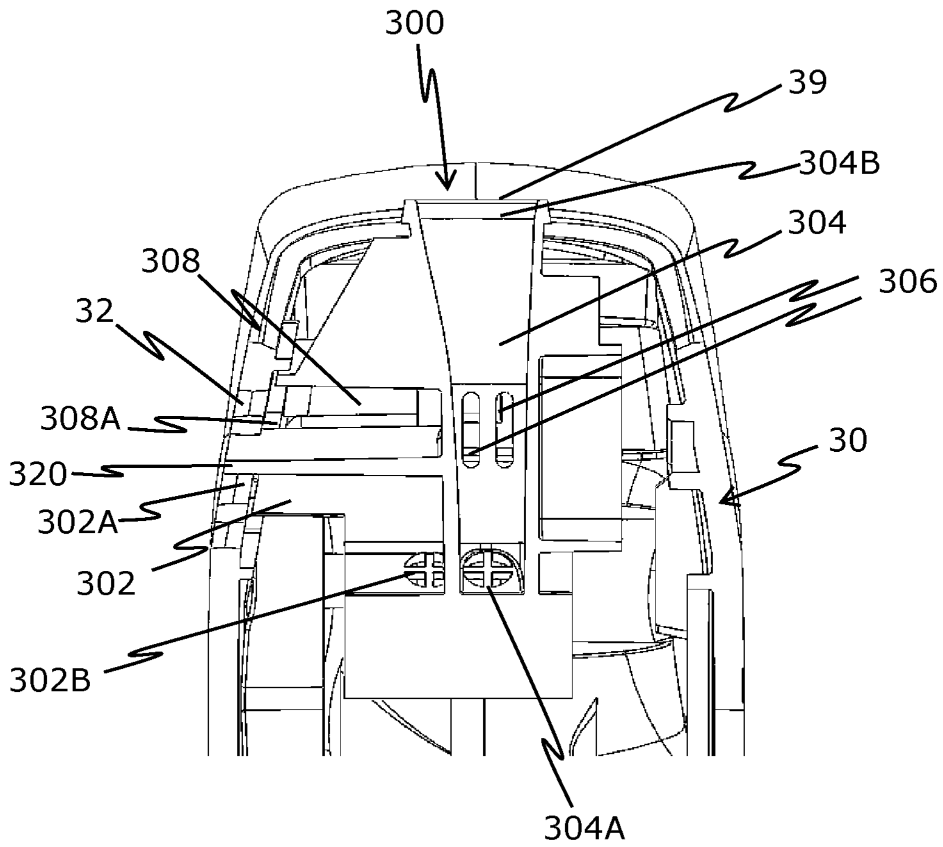
FIG. 3C is a cross-sectional view of the manifold of FIG. 3A inside a dispenser device.

Referring to FIGS. 3A to 3C, a manifold 300 in accordance with a third embodiment of the invention comprises a first chamber 302 comprising a first chamber inlet 302A and a first chamber outlet 302B.

The manifold 300 also has a conduit 304 having a conduit inlet 304A and a conduit outlet 304B. The conduit 304 has an elongate length between the conduit inlet 304A and the conduit outlet 304B. A pair of bleed inlets 306 are arranged side-by-side in a wall of the conduit 304 outside of the first chamber 302. In this example, the pair of bleed inlets 306 are located about halfway along the length of the conduit 304. Each of the bleed inlets 306 defines an oblong shaped opening in the wall of the conduit 304.

The manifold 300 further comprises a second chamber 308 having a second chamber inlet 308A. The second chamber 308 is in fluid connection with the pair of bleed inlets 306. In the manifold 300, the first chamber 302 and second chamber 308 are located side-by-side (i.e. adjacent to one another) on the same side of the conduit 304. The first and second chambers 302, 308 are separated from each other by a dividing wall 320. The direction of each of the bleed inlets 306 into the conduit 304 is generally orthogonal to the direction of the first chamber inlet 302A into the first chamber 302 and to the direction of the second chamber inlet 308A into the second chamber 308.

In use, the first chamber 302 is arranged to direct a first flow of air (not shown) from the first chamber inlet 302A to the first chamber outlet 302B, where it passes through a supply of medicament powder (not shown) positioned next to both the first chamber outlet 302B and conduit inlet 304A. As the first flow of air passes through the supply of medicament, it becomes entrained with the medicament powder. The first flow of air entrained with medicament powder then flows into the conduit inlet 304A and along the conduit 304 to the conduit outlet 304B, where it exits the manifold 300.

The second chamber 308 is arranged to direct a second flow of air (not shown) from the second chamber inlet 308A to the bleed inlets 306. The bleed inlets 306 are configured to direct the second flow of air into the conduit 304 to disruptively impact the first flow of air entrained with medicament powder as it flows through the conduit 304. This advantageously increases the FP fraction of the medicament powder entrained in the first flow of air as it passes through the conduit 304.

FIG. 3C provides a cross-sectional view of the manifold 300 inside a dispenser device 30. The dispenser device 30 has an inlet grate 32 and a mouthpiece 39. The inlet grate 32 is in fluid connection with both the first and second chamber inlets 302A, 308A. The dividing wall 320 abuts the inlet grate 32. The mouthpiece 39 is in fluid connection with the conduit outlet 304B.

In use, the first chamber 302 is arranged to draw air external to the device 30 into the first chamber 302 through the inlet grate 32 and first chamber inlet 302A. The second chamber 308 is arranged to draw air external to the device 30 into the second chamber 308 through the inlet grate 32 and second chamber inlet 308A. The dividing wall 320 acts to divide the air drawn in through the inlet grate 32 into separate first and second air flows (not shown) in the first and second chambers 302, 308 respectively. The first flow of air entrained with medicament powder exits the device 30 through the mouthpiece 39.

Figure 4A:
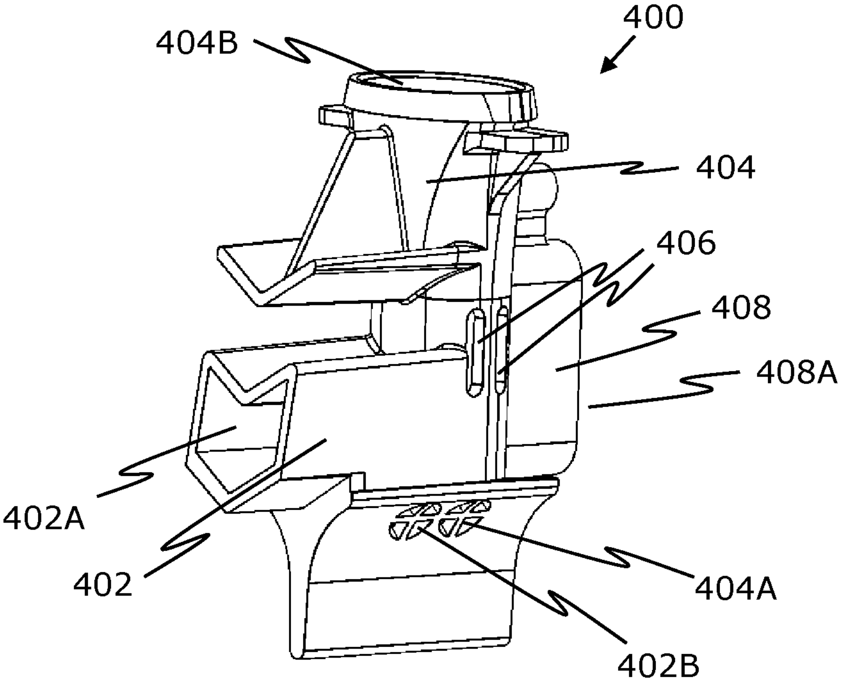
FIG. 4A is a perspective view of a manifold in accordance with a fourth embodiment of the invention.
Figure 4B:
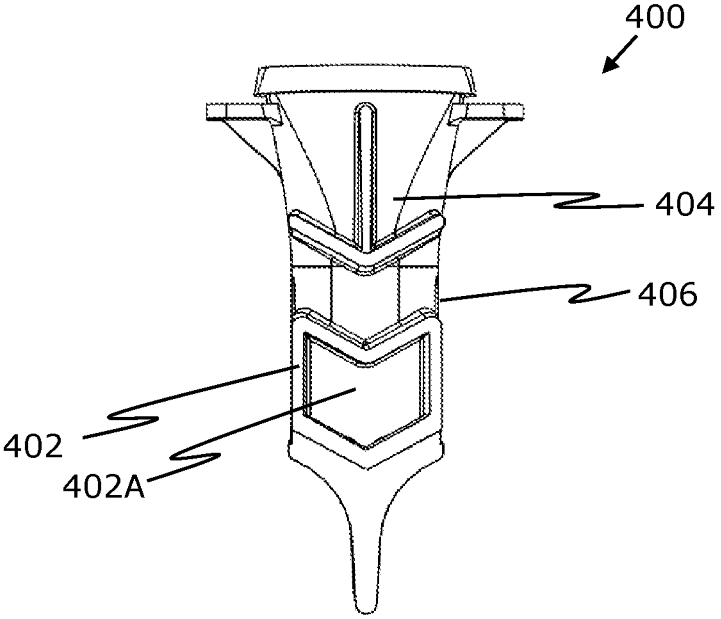
FIG. 4B is a side view of the manifold of FIG. 4A.
Figure 4C:
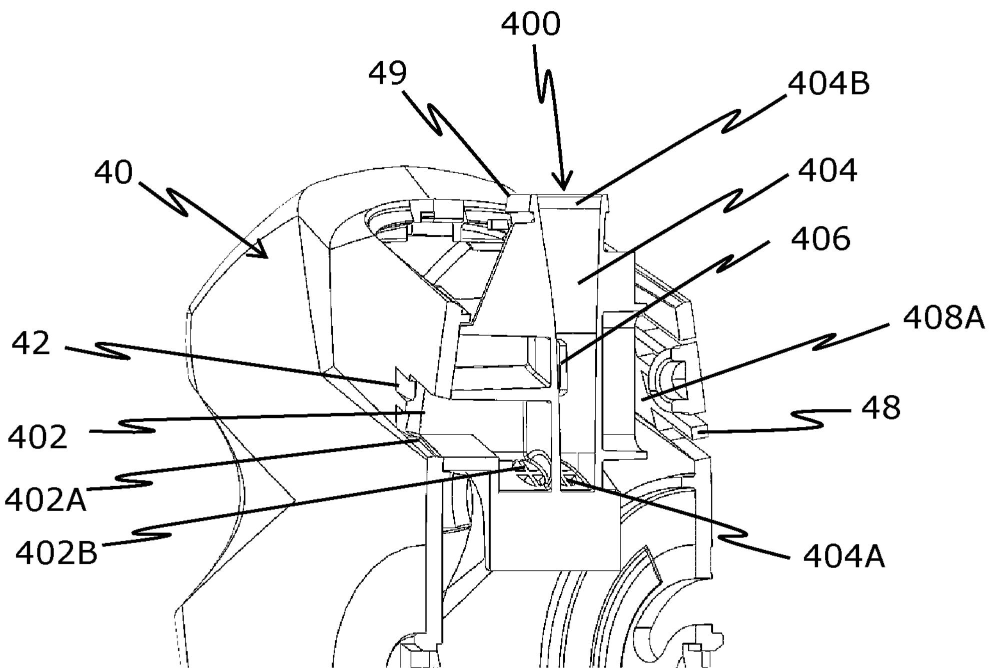
FIG. 4C is a cross-sectional view of the manifold of FIG. 4A inside a dispenser device.

Referring to FIGS. 4A to 4C, a manifold 400 in accordance with a fourth embodiment of the invention comprises a first chamber 402 comprising a first chamber inlet 402A and a first chamber outlet 402B.

The manifold 400 also has a conduit 404 having a conduit inlet 404A and a conduit outlet 404B. The conduit 404 has an elongate length between the conduit inlet 404A and the conduit outlet 404B. A pair of bleed inlets 406 are arranged side-by-side in a wall of the conduit 404 outside of the first chamber 402. In this example, the pair of bleed inlets 406 are located about halfway along the length of the conduit 404. Each of the bleed inlets 406 defines an oblong shaped opening in the wall of the conduit 404.

The manifold 400 further comprises a second chamber 408 having a second chamber inlet 408A. The second chamber 408 is in fluid connection with the pair of bleed inlets 406. In the manifold 400, the first chamber 402 and second chamber 408 are located on opposite sides of the conduit 404. The direction of each of the bleed inlets 406 into the conduit 404 is orthogonal to the direction of the first chamber inlet 402A into the first chamber 402 and to the direction of the second chamber inlet 408A into the second chamber 408.

In use, the first chamber 402 is arranged to direct a first flow of air (not shown) from the first chamber inlet 402A to the first chamber outlet 402B, where it passes through a supply of medicament powder (not shown) positioned next to both the first chamber outlet 402B and conduit inlet 404A. As the first flow of air passes through the supply of medicament, it becomes entrained with the medicament powder. The first flow of air entrained with medicament powder then flows into the conduit inlet 404A and along the conduit 404 to the conduit outlet 404B, where it exits the manifold 400.

The second chamber 408 is arranged to direct a second flow of air (not shown) from the second chamber inlet 408A to the bleed inlets 406. The bleed inlets 406 are configured to direct the second flow of air into the conduit 404 to disruptively impact the first flow of air entrained with medicament powder as it flows through the conduit 404. This advantageously increases the FP fraction of the medicament powder entrained in the first flow of air as it passes through the conduit 404.

FIG. 4C provides a cross-sectional view of the manifold 400 inside a dispenser device 40. The dispenser device 40 has first and second inlet grates 42, 48 and a mouthpiece 49. The first inlet grate 42 is in fluid connection with the first chamber inlet 402A. The second inlet grate 48 is in fluid connection with the second chamber inlet 408A. The mouthpiece 49 is in fluid connection with the conduit outlet 404B.

In use, the first chamber 402 is arranged to draw air external to the device 40 into the first chamber 402 through the first inlet grate 42 and first chamber inlet 402A. The second chamber 408 is arranged to draw air external to the device 40 into the second chamber 408 through the second inlet grate 48 and second chamber inlet 408A. The first flow of air entrained with medicament powder exits the device 40 through the mouthpiece 49.

Figure 5A:
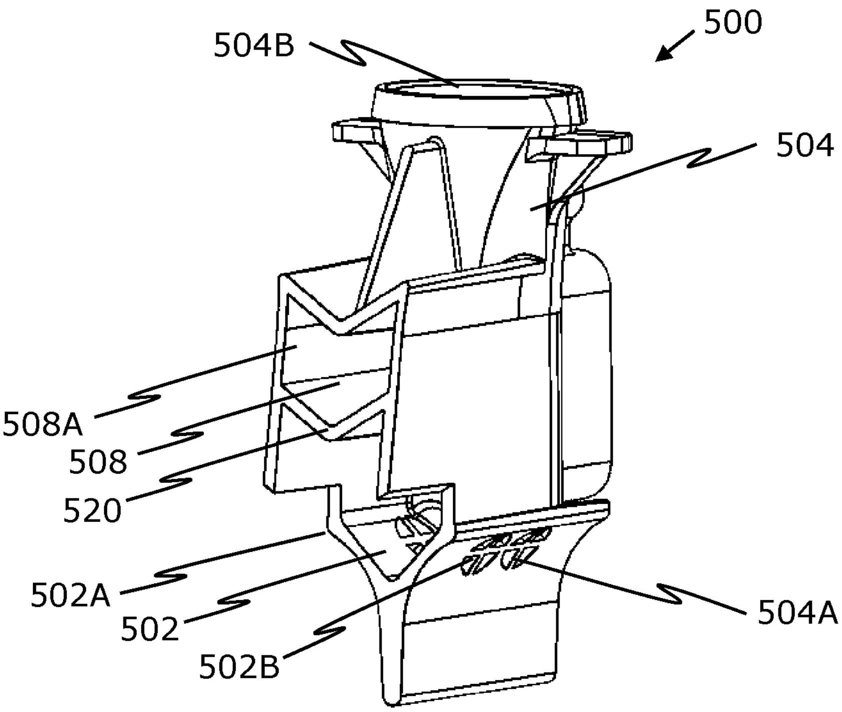
FIG. 5A is a perspective view of a manifold in accordance with a fifth embodiment of the invention.
Figure 5B:
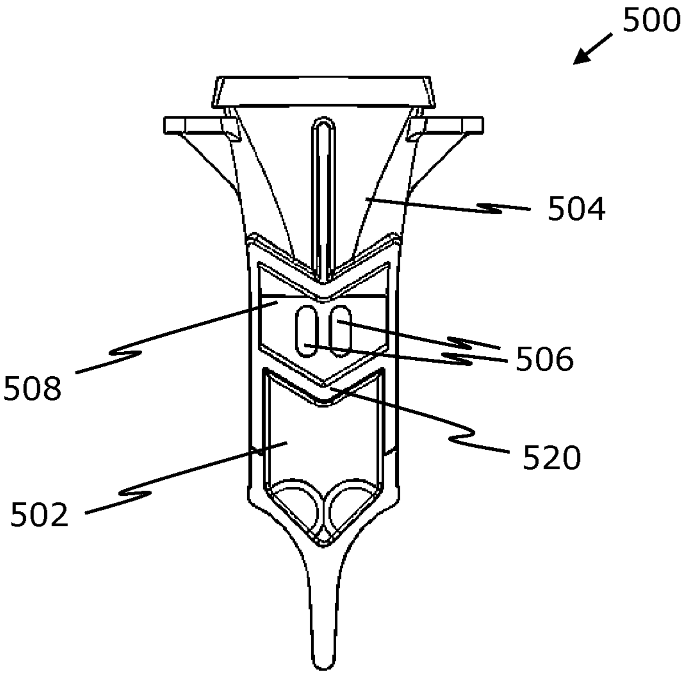
FIG. 5B is a side view of the manifold of FIG. 5A.
Figure 5C:
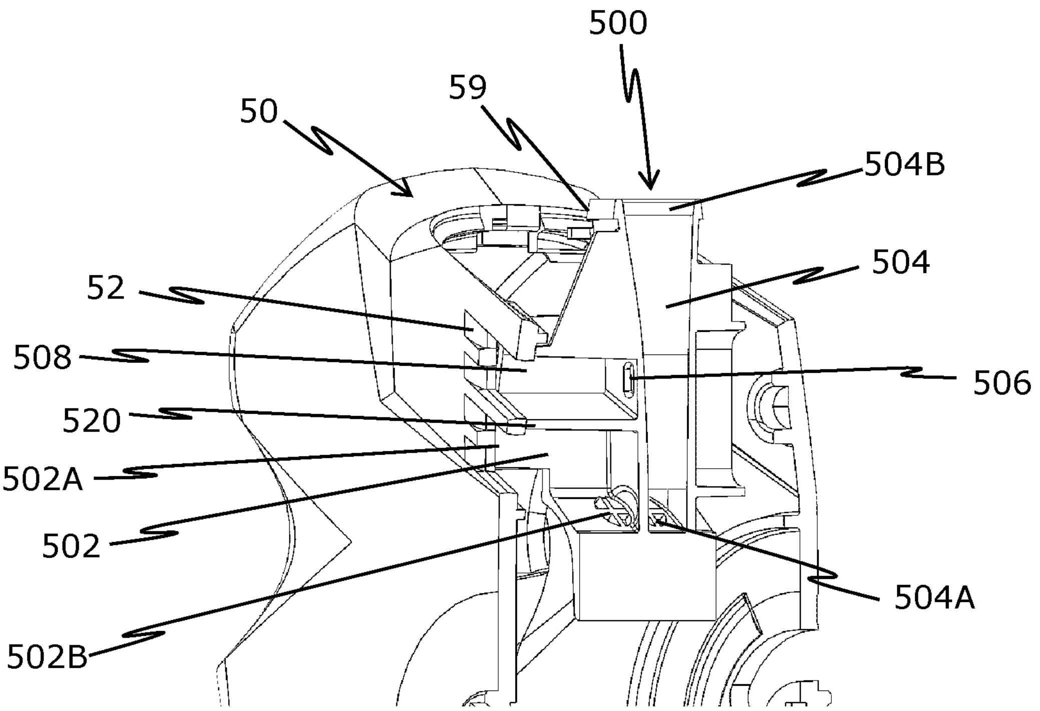
FIG. 5C is a cross-sectional view of the manifold of FIG. 5A inside a dispenser device.

Referring to FIGS. 5A to 5C, a manifold 500 in accordance with a fifth embodiment of the invention comprises a first chamber 502 comprising a first chamber inlet 502A and a first chamber outlet 502B.

The manifold 500 also has a conduit 504 having a conduit inlet 504A and a conduit outlet 504B. The conduit 504 has an elongate length between the conduit inlet 504A and the conduit outlet 504B. A pair of bleed inlets 506 are arranged side-by-side in a wall of the conduit 504 outside of the first chamber 502. In this example, the pair of bleed inlets 506 are located about halfway along the length of the conduit 504. Each of the bleed inlets 506 defines an oblong shaped opening in the wall of the conduit 504.

The manifold 500 further comprises a second chamber 508 having a second chamber inlet 508A. The second chamber 508 is in fluid connection with the pair of bleed inlets 506. In the manifold 500, the first chamber 502 and second chamber 508 are located side-by-side (i.e. adjacent to one another) on the same side of the conduit 504. The first and second chambers 502, 508 are separated from each other by a dividing wall 520. The direction of each the bleed inlets 506 into the conduit 504 is generally in line with the direction of the first chamber inlet 508A into the first chamber 502 and to the direction of the second chamber inlet 508A into the second chamber 508.

In use, the first chamber 502 is arranged to direct a first flow of air (not shown) from the first chamber inlet 502A to the first chamber outlet 502B, where it passes through a supply of medicament powder (not shown) positioned next to both the first chamber outlet 502B and conduit inlet 504A. As the first flow of air passes through the supply of medicament, it becomes entrained with the medicament powder. The first flow of air entrained with medicament powder then flows into the conduit inlet 504A and along the conduit 504 to the conduit outlet 504B, where it exits the manifold 500.

The second chamber 508 is arranged to direct a second flow of air (not shown) from the second chamber inlet 508A to the bleed inlets 506. The bleed inlets 506 are configured to direct the second flow of air into the conduit 504 to disruptively impact the first flow of air entrained with medicament powder as it flows through the conduit 504. This advantageously increases the FP fraction of the medicament powder entrained in the first flow of air as it passes through the conduit 504.

FIG. 5C provides a cross-sectional view of the manifold 500 inside a dispenser device 50. The dispenser device 50 has an inlet grate 52 and a mouthpiece 59. The inlet grate 52 is in fluid connection with both the first and second chamber inlets 502A, 508A. The dividing wall 520 abuts the inlet grate 52. The mouthpiece 59 is in fluid connection with the conduit outlet 504B.

In use, the first chamber 502 is arranged to draw air external to the device 50 into the first chamber 502 through the inlet grate 52 and first chamber inlet 502A. The second chamber 508 is arranged to draw air external to the device 50 into the second chamber 508 through the inlet grate 52 and second chamber inlet 508A. The dividing wall 520 acts to divide the air drawn in through the inlet grate 52 into separate first and second air flows (not shown) in the first and second chambers 502, 508 respectively. The first flow of air entrained with medicament powder exits the device 50 through the mouthpiece 59.

The invention claimed is:

1. A manifold for delivery of medicament powder from a dispenser device, the manifold comprising:

a first chamber comprising a first chamber inlet and a first chamber outlet, the first chamber arranged to direct a first flow of air from the first chamber inlet to the first chamber outlet;

a conduit having a conduit inlet and a conduit outlet, wherein the first chamber outlet and the conduit inlet are arranged such that when a supply of medicament powder is positioned proximal thereto the first flow of air is directed from the first chamber outlet to the conduit inlet via the supply of medicament powder to entrain the medicament powder and provide a flow of air entrained with medicament powder through the conduit from the conduit inlet to the conduit outlet;

a pair of bleed inlets in a wall of the conduit outside of the first chamber arranged to direct a second flow of air into the conduit to disruptively impact the flow of air entrained with medicament powder through the conduit; and a second chamber comprising a second chamber inlet arranged to direct the second flow of air from the second chamber inlet to the pair of bleed inlets, wherein a direction of the pair of bleed inlets into the conduit is substantially orthogonal to a direction of the second chamber inlet into the second chamber.

2. The manifold of claim 1, wherein the first and second chambers are located on opposite sides of the conduit.

3. The manifold of claim 1, wherein the first and second chambers are located on a same side of the conduit.

4. The manifold of claim 1, wherein the pair of bleed inlets are located on a first side of the conduit and the first chamber is located at a second side of the conduit orthogonal to the first side.

5. The manifold of claim 4, wherein a direction of the pair of bleed inlets into the conduit is orthogonal to a direction of the first chamber inlet into the first chamber.

6. The manifold of claim 1, wherein the bleed inlet is located on a first side of the conduit and the first chamber is located at a second side of the conduit opposite to the first side.

7. The manifold of claim 6, wherein the direction of the bleed inlet into the conduit is in line with the direction of the first chamber inlet into the first chamber.

8. The manifold of claim 1, wherein the bleed inlet and first chamber are located on the same side of the conduit.

9. The manifold of claim 8, wherein the direction of the bleed inlet into the conduit is parallel to the direction of the first chamber inlet into the first chamber.

10. The manifold of claim 1, wherein the pair of bleed inlets are located on the same side of the conduit, and wherein the pair of bleed inlets are arranged side-by-side.

11. The manifold of claim 1, wherein the conduit has an elongate length between the conduit inlet and the conduit outlet.

12. The manifold of claim 11, wherein the pair of bleed inlets are located partway along the length of the conduit, and wherein the pair of bleed inlets are located about halfway along the length of the conduit.

13. The manifold of claim 1, wherein each of the pair of bleed inlets comprises an oblong or oval opening in the wall of the conduit.

14. The manifold of claim 1, wherein each of the pair of bleed inlets has a width across its widest point greater than a depth of each of the pair of bleed inlets through the wall of the conduit.

15. A dispenser device comprising: a manifold of claim 1; and a medicament chamber in fluid connection with the first chamber outlet and the conduit inlet, wherein the medicament chamber comprises the supply of medicament powder.

16. The dispenser device of claim 15, comprising first and second device inlets in fluid connection with the first chamber inlet and the pair of bleed inlets respectively.

17. The dispenser device of claim 15, comprising first and second device inlets in fluid connection with the first chamber inlet and the second chamber inlet respectively.

18. The dispenser device of claim 15, comprising a device inlet in fluid connection with the first chamber and the bleed inlet.

19. The dispenser device of claim 18, wherein a wall of the first chamber abuts the device inlet to divide external air entering the dispenser device through the device inlet into first and second airflows inside the device.

* * * * *